United States Patent [19]

Asakawa et al.

[11] 4,086,537

[45] Apr. 25, 1978

[54] TIME DIVISION MULTIPLEX COMMUNICATION RECEIVING APPARATUS

[75] Inventors: Shigeru Asakawa, Fujisawa; Fumio Sugiyama, Yokohama; Akio Gotoh; Shigenori Okamoto, both of Tokyo, all of Japan

[73] Assignees: Nippon Telegraph & Telephone Public Corporation, Tokyo; Tokyo Shibaura Electric Co., Ltd., Kawasaki, both of Japan

[21] Appl. No.: 652,237

[22] Filed: Jan. 26, 1976

[30] Foreign Application Priority Data

Jan. 24, 1975 Japan .................................. 50-10342

[51] Int. Cl.$^2$ ............................................. H04J 3/08
[52] U.S. Cl. ........................................ 325/478; 325/58; 179/15 BS; 343/204; 178/53
[58] Field of Search .................. 325/478, 492, 51, 53, 325/58, 69.1; 343/177, 179, 200, 204; 179/15 AL, 15 BA, 15 BF, 15 BS, 15 AQ; 178/53

[56] References Cited

U.S. PATENT DOCUMENTS

| | | | |
|---|---|---|---|
| 3,409,889 | 11/1968 | Graham | 325/58 |
| 3,757,032 | 9/1973 | Minerd et al. | 325/492 |
| 3,774,114 | 11/1973 | Dahlgren | 325/492 |
| 3,830,982 | 8/1974 | Christiansen | 179/15 BS |
| 3,843,843 | 10/1974 | Solomon et al. | 179/15 BS |
| 3,889,064 | 6/1975 | Fletcher | 179/15 BS |
| 3,903,371 | 9/1975 | Colton et al. | 179/15 BS |
| 3,914,536 | 10/1975 | Mohri | 179/15 BS |
| 3,940,563 | 2/1976 | Susset | 179/15 BS |
| 3,987,250 | 10/1976 | Barbier et al. | 179/15 BS |

Primary Examiner—Robert L. Griffin
Assistant Examiner—Tommy P. Chin
Attorney, Agent, or Firm—Oblon, Fisher, Spivak, McClelland & Maier

[57] ABSTRACT

Receiving conditions are classified into three types—"good condition", "intermediate condition" and "bad condition". Where the receiving condition is an "intermediate condition," a receiving section continues with a receiving operation by supplying power thereto through a first normally closed switch from a power source. Where the receiving condition is both a "good condition" and a "bad condition", the first normally closed switch is closed, only during a specific period having the necessary information signals supplied from a time band designating means, to supply power from the power source to the receiving section thus to extract the necessary information signals by a signal processing section from the receiving input signals supplied from the receiving section, whereas the first normally closed switch is opened, during the remaining period to interrupt the power supply from the power source to the receiving section thus to stop the receiving operation.

15 Claims, 23 Drawing Figures

TIME DIVISION MULTIPLEX COMMUNICATION RECEIVING APPARATUS

BACKGROUND OF THE INVENTION

This invention relates to a time-division multiplex communication receiving apparatus, and more particularly to a time division multiplex communication receiving apparatus having an improved power reducing means.

Generally, in a time-division multiplex communication system, signals on a plurality of communication lines are transmitted through a single transmission line by using in common this transmission line in a manner that it is divided in terms of time. Among such communication systems there is known a system wherein from a key station the time-divided multiple information signals are transmitted; the receiving apparatus of each of a plurality of terminal offices receives said information signals; and in response to the received information signals each terminal office makes various operations, for example, delivers return signals or permits the generation of control signals for the other apparatuses.

In the time-division multiplex communication system, however, those of the time series-arranged information signals transmitted from the key station which are to be received by the receiving apparatus of the terminal office are arranged at specific time intervals. That is, since there exists a specific relationship in respect of time between the receiving apparatus and the information signals received therein, the receiving apparatus can extract the information signals necessary thereto in accordance with this specific time relationship.

Accordingly, to maintain the receiving apparatus always at a "receivable condition" for receiving the information signals sent from the key station to make the associated circuits operative results in a wasteful power consumption, which results in a remarkable decrease in the service life of receiving equipments, which results in an increase in the maintenance expenses of the receiving equipments such as batteries.

Particularly in the case where the above-mentioned time-division multiplex communication receiving apparatus is, for example, a portable radio receiver for use in a selective calling system, this receiver is desired to be compact, light and resistible to long use. However, a battery constituting the power source of that receiver is only stored with a specific amount of energy. Accordingly, where it is desired to increase the service life of the receiver on the basis of such specific or limited amount of electricity, the power consumption as average in the receiver should be made small.

For the above-mentioned reason, all sections of the receiver are kept operative over all time bands until the receiver is fully synchronized with the information signals sent over from the key station, whereas, after the synchronization with said information signals has been achieved, part of the receiver, for example, a radio reception amplification section is so designed that it ceases to operate so as to decrease the power consumption during a period in which it has no information signals to be supplied to itself.

Usually, however, such portable radio receiver is often moved from one place to another with a subscriber. Accordingly, in places such as an underground station yard it often happens that radio reception is made entirely impossible. In such a case, the receiver provided with a power reducing means as mentioned above fails to be synchronized, so that all sections of the receiver have to be kept always operative until the synchronization is achieved, resulting in a wasteful power consumption.

SUMMARY OF THE INVENTION

The object of the invention is to provide a time-division multiplex communication receiving apparatus capable of reducing power consumption as much as possible without decreasing the receiving performance of the apparatus.

According to the invention, an apparatus is provided with a means for classifying receiving conditions into several types and a time band designating means for designating a specific time zone corresponding to each type of receiving condition, whereby a switch is controlled in accordance with each receiving condition type during a specific length of time determined by said time band designating means to control the power supplied from a power source to each section of the apparatus thus to decrease largely the power consumption of the apparatus.

Further, according to the invention, since a system similar to an independently synchronous system is used for a synchronous circuit means corresponding to each receiving condition type, stable synchronization can be achieved correspondingly to each receiving condition type, so that the communication relationship can be securely maintained without decreasing the receiving performance of the apparatus to make the apparatus highly reliable.

Further, according to the invention, there is provided said designating means for designating a cyclically repetitive signal period, i.e., a predetermined time band, so that the apparatus can be more decreased in respect of power consumption.

The other objects, features or advantages of the invention will become apparent from the following detailed description when taken in conjunction with the accompanying drawings in which.

DETAILED DESCRIPTION OF THE PREFERRED EMBODIMENTS

Figure 1:
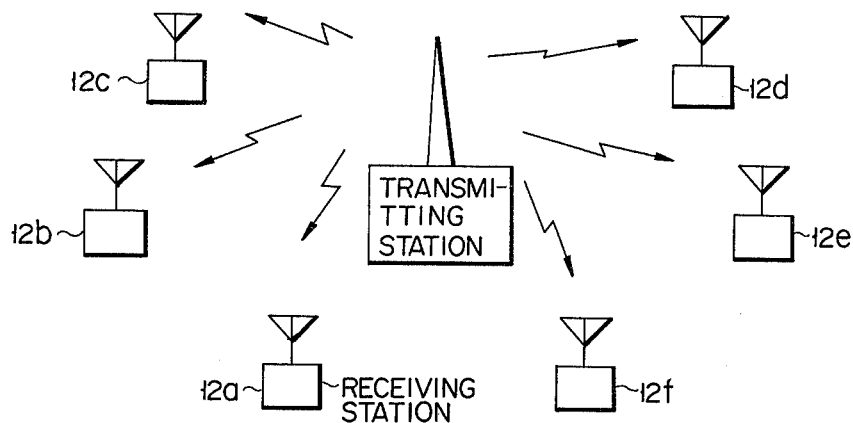
FIG. 1 is a view for explaining an example of time-division multiplex communication.
Figure 2:
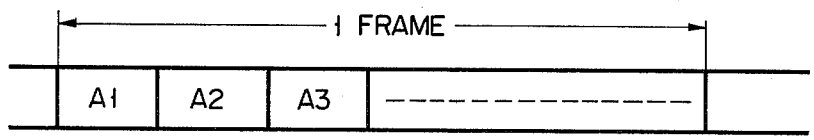
FIG. 2 is a view showing an example of a time-divisional multiple signal.

According to the invention, in the time-division multiplex communication, as shown in FIG. 1, such a frame-shaped time-divided multiple signal as shown in FIG. 2 is sent out from a single transmitting station 11 to a plurality of receiving stations (receiving apparatus) 12a to 12f. Upon receipt of the time-divided multiple signal, each of the receiving stations 12a to 12f extracts only information signals necessary thereto from a time zone allotted thereto.

Accordingly, the multiple signal shown in FIG. 2 is constructed such that a plurality of signals A1, A2, . . . having different information sources are arranged in time-series in a corresponding plurality of time slots or zones prepared by dividing one frame in terms of time. Sometimes, the signals A1, A2, . . . of the multiple signal correspond to the receiving apparatuses 12a, 12b, . . . , respectively. Sometimes, for example, the signal A1 corresponds to a group of receiving apparatuses 12a, 12b and 12c. Or sometimes, conversely, a plurality of signals correspond, in the form of a group, to a single receiving apparatus.

Further, in some cases, the signals A1, A2, A3, . . . are successively arranged as shown in FIG. 2, and in other, are disposed in a manner scattered over different frames.

In any case, there is a specific relationship in respect of time between each receiving apparatus and each signal of the multiple signal. In accordance with this time relationship each receiving apparatus can extract the information necessary thereto.

This invention employs a frame-synchronization system as the above-mentioned information extracting system. The frame-synchronization system is of the system wherein synchronous codes of specific patterns disposed at the foremost end, rearmost end, or other specific places, of one frame are detected thereby to extract the information signal disposed in a specific time zone determined in accordance with said synchronous codes. This embodiment refers to a receiving apparatus used in a portable radio calling communication system. That is to say, this receiving apparatus is of the type wherein a plurality of time-divisional multiple calling signals are sent out from a signal transmitting station through a single carrier channel to individually call a "portable radio calling apparatus" thereby to "call" a subscriber having the "portable radio calling apparatus".

According to the invention, in order to decrease the power consumption, the time-divisional multiple signal assumes a frame configuration wherein a plurality of subscribers (receiving apparatuses) to be called through one carrier channel are divided into a plurality of groups; and a particular individual number is given to each subscriber and the individual numbers of the subscribers belonging to one group are successively disposed. The frame configurations are shown in FIG. 3.

Figure 3:
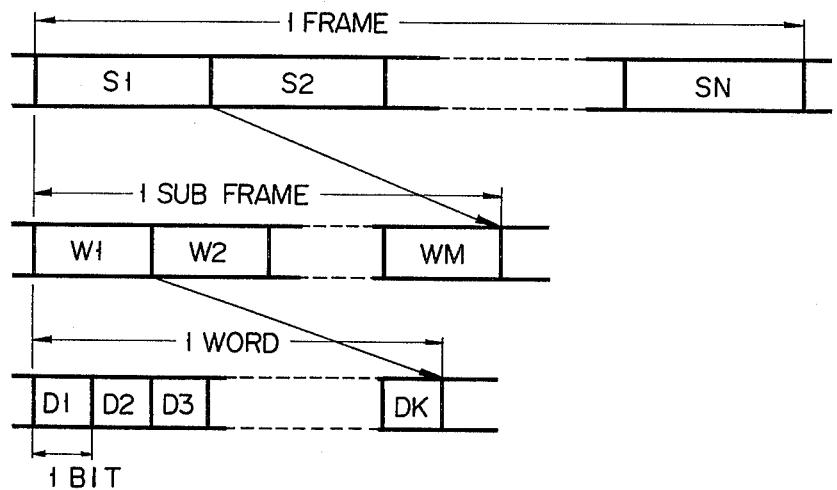
FIG. 3 shows frame configurations each indicating the time-divisional multiple signal used in a receiving apparatus of the invention.

As shown in FIG. 3, the individual numbers of the subscribers are divided into N groups of one frame, and the individual numbers of the subscribers of each of the N groups are collectively disposed in each of subframes $S_1$ to $S_N$, respectively. One subframe, for example $S_1$, is composed of words $W_1$ to $W_M$. Usually, the number M of words is, though not always required to be, smaller than the number of all subscribers. The words $W_1$ to $W_M$ denote the individual numbers of the subscribers, respectively. One word, for example, $W_1$ is composed of bits $D_1$ to $D_K$ and denotes the individual number identification individual signal or code of subscribers) in a combined form of binary codes. In the above-mentioned time-divisional multiple signal, in some cases, a frame synchronizing signal is disposed at the foremost end, rearmost end, or other specific places, of one frame, and, in other cases, a particular group number code given to a group corresponding to one subframe is disposed at specific places of each subframe to use this particular group number code as equivalent to the frame synchronizing signal. In this embodiment, explanation is made of the latter cases.

By the way, in any of the above-mentioned cases, the "portable radio calling receiving apparatuses" belonging to one group, when operative or inoperative in accordance with a specific time length or period in a final case, i.e., in the case where the receiving condition is "good", deal only with the frame synchronizing signal (or group number code) and that subframe corresponding to said one group which is judged from the position of said frame synchronizing signal.

Figure 4:
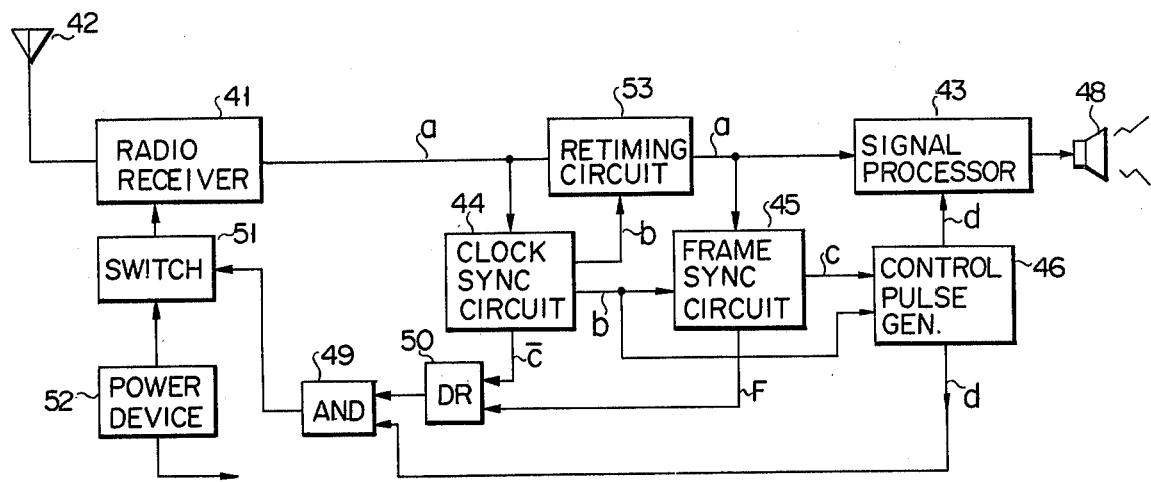
FIG. 4 is a block diagram showing a receiving apparatus according to an embodiment of the invention.

FIG. 4 shows the receiving apparatus according to an embodiment of the invention. A part or some parts of the apparatus, for example, radio receiver section is made operative or inoperative in accordance with the type of receiving conditions. These receiving conditions are classified into three types — for example, "good", "intermediate" and "bad". These three receiving conditions are classified in accordance with the synchronous conditions of the receiving apparatus.

That is to say, the receiving apparatus receives a multiple signal having such a frame configuration as shown in FIG. 3, sent from the transmitting station shown in FIG. 1 and as a result if, in respect of, for example, both of, two synchronous conditions — the synchronous condition of said frame — synchronizing signal, i.e., the frame synchronization and the synchronous condition of binary codes constituting each word, i.e., clock synchronization, the receiving apparatus is synchronized, the receiving condition is "good"; if the receiving apparatus is synchronized in respect of clock synchronization but not in respect of frame synchronization, the receiving condition is "intermediate"; and if the receiving apparatus is neither synchronized in respect of clock synchronization nor in respect of frame synchronization, the receiving condition is "bad".

In FIG. 4, a radio receiver 41 receives through an antenna 42 an FM multiple modulation signal sent over from a transmitting station, and demodulates and amplifies said modulation signal to convert it into a time-divisional digital signal $a$ having a base band. The radio receiver 41 can be composed of a conventional FM demodulation and amplification circuit. The digital signal $a$ is added, on one hand, to a signal processor 43 as later described and supplied, on the other hand, to a clock synchronization circuit 44 and a frame synchronization circuit 45.

The clock synchronization circuit 44 has an independent oscillating source, for example, crystal oscillator, and functions to cause the phase of its clock signal to coincide with the phase of a clock signal contained in the digital clock signal $a$, thereby to generate a clock signal $b$ synchronized with the digital signal $a$.

That is to say, in the case where part of the receiving apparatus, especially the radio receiver 41 has a long inoperative period, the clock synchronization circuit 44 ceases to be synchronized with a clock signal component of the signal delivered from the transmitting side to permit a free oscillation output of said crystal oscillator to become said clock signal $b$. If, accordingly, a dependent synchronization system for obtaining synchronization in accordance with the signal supplied from the transmitting side is adopted so as to extract a clock signal component of said signal, it may happen that the terminating point of the inoperative period fails to be designated correctly due to the phase displacement of the signal supplied from the transmitting side. This will be described later in more detail. In contrast, where a completely independent synchronization system is adopted, once the synchronized condition between the transmitting and receiving apparatuses has been lost, it becomes meaningless to make the part of the receiving apparatus operative or inoperative in accordance with the time series on the side of reception. In some cases, there is a fear that the receiving apparatus of the completely independent synchronization system causes its part to be made inoperative even in a time zone in which an information signal component necessary to the receiving apparatus exists in the signal sent from the transmitting side. Accordingly, by using the clock signal sent from the transmitting side as a synchronizable signal on the premise that a system similar to the independent synchronization system is adopted in principle, the respective demerits of both independent and dependent synchronization systems are removed to realize a synchronization system suitable to exercise of the invention.

Figure 5:
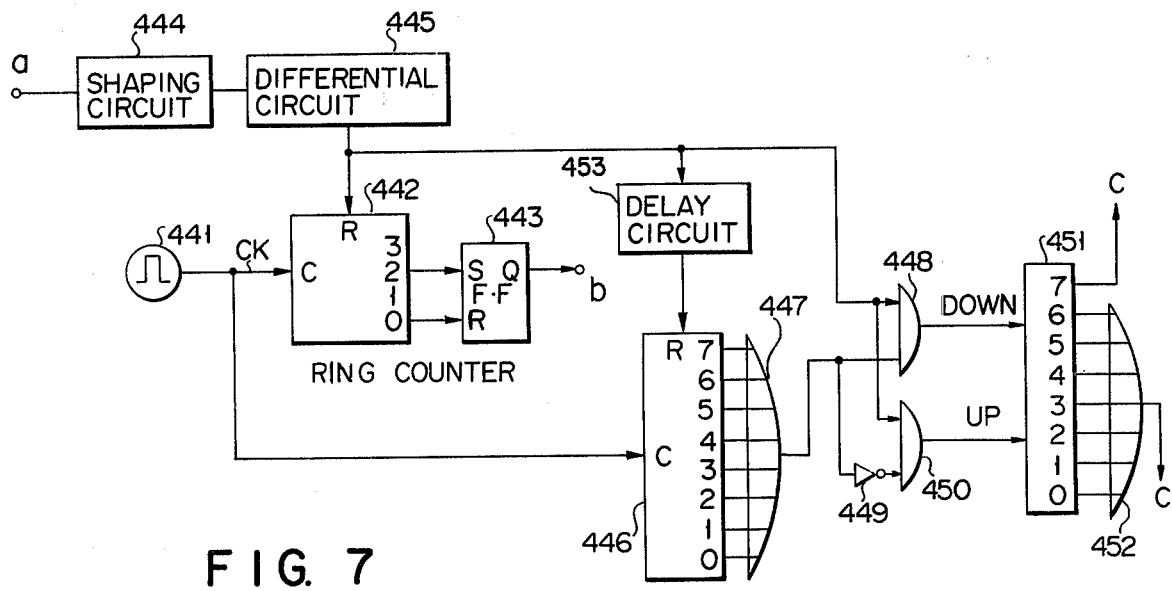
FIG. 5 is a block diagram of a clock-synchronizarion circuit of the receiving apparatus shown in FIG. 4.

FIG. 5 shows in detail a fundamental construction of the clock synchronization circuit 44. In FIG. 5, a reference numeral 441 denotes a high speed clock signal generating source for generating a high speed clock signal having a frequency $4fs$ about four times as high as the frequency $fs$ of the data speed of the received digital signal $a$, and the clock signal CK from the high speed clock signal generating source 441 is counted always by a ring counter 442. This ring counter 442 counts from "0" to "3" as one cycle and, in its counting process, drives the next-stage flip-flop 443 by the outputs "2" and "0" to generate the received clock signal $b$.

The received and demodulated digital signal $a$ (data speed $fs$) having a base band undergoes distortion when being on a transmission line between the transmitting and receiving apparatuses. Therefore, after shaped into pulse form by a waveform shaping circuit 444, the digital signal $a$ is differentiated by a differential circuit 445 to detect a point of time at which level is made opposite (one or both of two points of time — a rise and a fall of the signal). The differential circuit 445 resets the ring counter 442 in corresponding relation to the polarity converted point of time of the detected signal $a$.

Accordingly, even when the input signal $a$ and the output "0" of the ring counter 442 are out of phase due to the difference between the transmitting and receiving clock frequencies, since the ring counter 442 is reset at the polarity converted point of time of the input signal $a$, the phase of the receiving clock signal is corrected to permit a synchronized condition to be established between the transmitting and receiving apparatuses. Further, even when the input signal $a$ ceases to be supplied and as a result the ring counter 442 ceases to be reset, said synchronized condition can be maintained within a range corresponding to said difference between the transmitting and receiving clock frequencies. Accordingly, from the output end of the flip-flop 443 is always delivered the clock signal $b$ whose frequency is equal to the clock frequency $f$ of the receiving input signal $a$ and whose phase substantially coincides with the phase of the signal $a$. Further, if, at the time when the ring counter 442 is reset, the reset output from the ring counter 442 is detected by, for example, an up-down counter 451, it can be judged whether this clock synchronization circuit as later described is kept in a fully synchronized condition C, or in a non-synchronized condition $\overline{C}$. That is, part of the output from the differential circuit 445 is supplied to a ring counter 446 through a delay circuit 453, and the output from the ring counter 446 is supplied to an AND circuit 448 through an OR circuit 447, and the output from the AND circuit 448 is supplied as a down signal to the up-down counter 451. Further, the output from the OR circuit 447 is supplied as an up signal to the up-down counter 451 through an inverter 449 and an AND circuit 450. Accordingly, it can be judged by the output from the up-down counter 451 whether the clock synchronization circuit 44 is kept in said condition C or $\overline{C}$. Note that where the clock synchronization circuit is kept in the fully synchronized condition C, the output from the counter 451 is made to be supplied through an OR circuit 452.

In the foregoing description, explanation was made by using the high speed clock signal generating source for generating a clock signal having a frequency about four times as high as the frequency of the input signal $a$. However, the frequency of this clock signal is not limited to about four times but may be about eight or four's other suitable integral multiples times as high as the frequency of the input signal *a*. Similarly, the clock signal frequency of the high speed clock signal generating source can be divided by using the ring counter 442 and flip-flop 443. In this case, the phase difference can be made further small.

Turning back to FIG. 4, the clock output *b* of the clock synchronization circuit 44 is supplied to a retaining circuit 53, which functions to cause the digital signal *a* from the radio receiver 41 to coincide with the clock output *b* in terms of timing.

The frame synchronization circuit 45 defects, in accordance with the phase relationship between the digital signal *a* and the clock signal *b* constituting the output of the clock synchronization circuit 44 synchronized with the clock signal on the transmitting side, that is, by causing a match of the digital signal *a* with the phase of the clock signal *b*, a frame synchronizing signal of specific pattern disposed in the digital signal *a*, thereby to determine the position of the frame synchronizing signal on a time axis (or on a subframe) of the digital signal *a*, thus to supply a frame synchronizing signal component *c* having said position information to a control pulse generating circuit 46.

Figure 6:
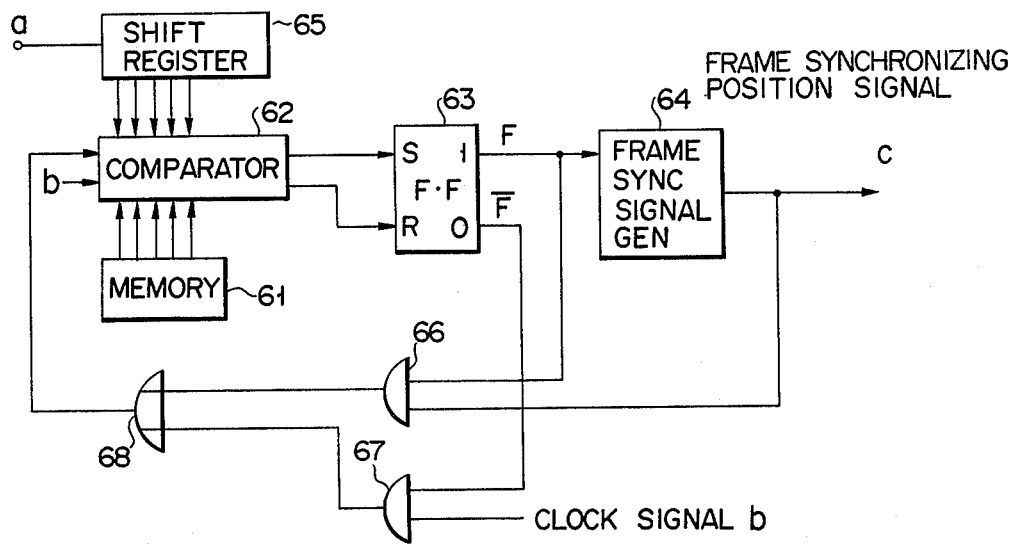
FIG. 6 is a block circuit diagram of a frame-synchronization circuit of the receiving apparatus shown in FIG. 4.

FIG. 6 shows in detail a fundamental construction of the frame synchronization circuit 45. In FIG. 6, a memory 61 is stored with that frame synchronizing signal of specific pattern composed of, for example, 16 binary-coded bits which is disposed in each subframe, for example, a frame synchronizing signal of specific pattern which, if, in FIG. 3, a subframe corresponding to the group to which the subscriber's receiving apparatus belongs is $S_1$, corresponds to the subframe $S_1$. The frame synchronizing signal of specific pattern stored in the memory 61 is supplied for each bit to a comparator 62. The input digital signal *a* is temporarily stored in a shift register 65 and then supplied in parallel for each bit to the comparator 62. Further, the clock signal *b* delivered from the clock synchronization circuit 44 is applied to the comparator 62. The clock signal *b* and the input signal *a* are compared for each bit by the comparator 62 with each other in terms of phase. Accordingly, the input synchronizing signal supplied to the comparator 62 and the synchronizing signal of specific pattern stored in the memory 61 are compared for each bit, when coincidence is obtained, the comparator 62 produces a coincidence output, which is applied to a set terminal of the next-stage flip-flop 63. This flip-flop 63 is for purpose of confirming that frame synchronization has been achieved or established, and the set output of the flip-flop 63 is made a frame synchronization-established information F while the reset output of the flip-flop 63 is made a frame synchronization-unestablished information F̄. Further, the set output F of the flip-flop 63 is applied to a frame synchronizing signal generating circuit 64, which produces said frame synchronizing position signal *c* in which the position of the frame synchronizing signal in a subframe is determined. This signal *c* is supplied to an AND circuit 66 together with the coincidence output F of the flip-flop 63 to obtain a logical product output while the clock signal *b* is supplied to an AND circuit 67 together with the noncoincidence output F̄ of the flip-flop 63 to obtain a logical product output. The outputs from the AND circuits 66 and 67 are supplied to the comparator 62 through an OR circuit 68 to control the comparing operation of the comparator 62. The above-mentioned frame synchronizing position signal *c* is applied to the next-stage control pulse generating circuit 46 for designating time zone.

The control pulse generating circuit 46 is driven by the clock signal *b* to cyclically repeatedly generate a control pulse *d* in accordance with a specific period, i.e., frame period.

Figure 7:
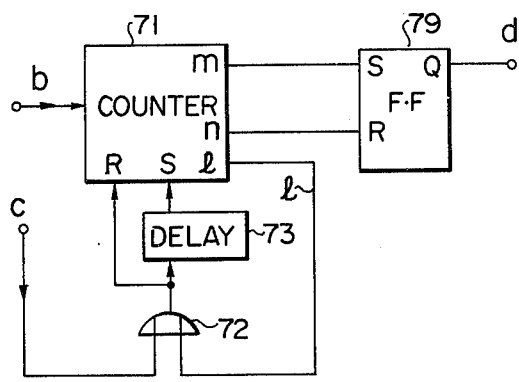
FIG. 7 is a block circuit diagram of a control pulse generating circuit of the receiving apparatus shown in FIG. 4.

FIG. 7 shows in detail the control pulse generating circuit 46. As shown in FIG. 7, this circuit 46 is provided with a counter 71. The counter 71 is driven by the clock signal *b* and starts to make the counting operation upon receipt of the frame synchronizing position signal *c*. When the counter 71 counts *m* bits, it produces a counter output, which becomes the set input of an R-SFF 79. When the counter 71 counts *n* bits, it produces a counter output, which becomes the reset input of the R-SFF 79. That is, the counter 71 counts up during the initial length of time of the frame synchronizing position signal *c* to produce an output, and when having counted the clock signals *b* corresponding in number to *m* bits and *n* bits, produces counter outputs. The outputs from the counter 71 are applied to the set and reset terminals of the R-SFF 79, respectively, and the R-SFF 79 produces a control pulse *d* through the output terminal Q thereof. When the counter 71 ceases to be supplied with the frame synchronizing position signal *c*, it counts *l* bits to produce a counter output *l*, which is supplied through an OR circuit 72 to a reset terminal R of the counter 71 to reset the counter 71. Further, the counter output *l* is applied through the OR circuit 72 to a delay circuit 73. Since the output from the delay circuit 73 is supplied to a set terminal S of the counter 71, the counter 71 reset as mentioned above is set in a very small length of time delayed by the delay circuit 73. Accordingly, the control pulse generating circuit 46 always generates the control pulse *d*. The OR circuit 72 is provided for this purpose, and is set by the frame synchronizaing position signal *c* and the counter output *l* corresponding to the *l* bits.

That is, the control pulse *d* produced from the control pulse generating circuit 46 is a reference signal for determining the initial and terminal points of time at which a selectively inoperative period of the receiving apparatus initiates and terminates. This control pulse *d* is cyclically produced in accordance with the frame synchronizing position signal *c* when the frame synchronization circuit 45 is kept synchronized.

The control pulse *d* is supplied, on the other hand, to the signal processor 43, which controls the operation of extracting the digital signal *a* supplied thereto a necessary information signal in a specific time zone.

Figure 8:
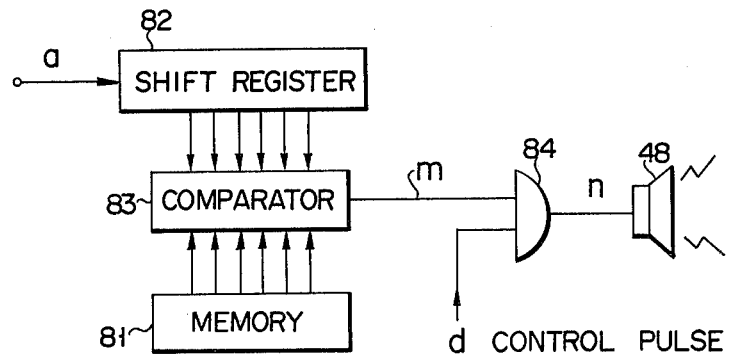
FIG. 8 is a block circuit diagram of a signal processing section of the receiving apparatus shown in FIG. 4.

FIG. 8 shows in detail the signal processor 43. As shown in FIG. 8, the signal processor 43 is provided with a memory 81 stored with the (identification individual code) of the receiving apparatuses carried by the subscribers, and a shift register 82 having the same capacity as the memory 81, in such a manner that the memory 81 corresponds for each bit to the register 82. The output from the memory 81 and the output from the shift register 82 supplied in turn with the digital signal *a* are compared for each bit by a comparator 83 with each other, and when both coincide with each other, the signal processor 43 produces a coincidence output *m*. Accordingly, the individual code of each subscriber is identified at this time. This coincidence output *m* is supplied to an AND circuit 84 to obtain a logical product between the coincidence output *m* and the control pulse *d* supplied to the AND circuit 84 from the control pulse generating circuit 46. Thus, from the AND circuit 84 is delivered an individual code signal or "call" signal. The "call" signal $n$ is applied to a recognizing means, for example, a buzzer 48 to cause it to call the subscriber thereby to cause him to recognize the fact that there is a "call".

The clock synchronization circuit 44 and frame synchronization circuit 45 not only constitute means for generating the control pulse $d$ but also constitute means for judging the receiving condition of the radio receiver 41 in cooperation with the OR circuit 50. In other words, in this embodiment, the receiving condition is judged in accordance with the synchronous condition of the clock and frame synchronization circuits 44, 45. That is, the clock synchronization circuit 44 compares the clock signal component on the transmitting side with its own clock signal component to produce a detection output C when the synchronization therebetween is established and a detection output $\overline{C}$ when the synchronization therebetween is not extablished. Similarly, the frame synchronization circuit 45 produces a detection output $\overline{F}$ when the frame synchronization is established and a detection output F when the frame synchronization is not established. Generally, it is impossible to have a condition wherein the frame synchronization is achieved; and the clock synchronization is not achieved, and therefore when it is assumed that $F \cdot \overline{C} = 0$, the above-mentioned three types of receiving conditions — "good", "intermediate" and "bad" can be expressed by the logical products $F \cdot C$, $\overline{F} \cdot C$ and $\overline{F} \cdot \overline{C}$, respectively.

In this embodiment, power saving is performed by causing a driving power source 52 whose power is supplied to the radio receiver 41 to be cut off by a switch 51 in accordance with the "good" and "bad" receiving conditions. Accordingly, when + is used to express a logical sum, a condition wherein power saving is attained can be expressed as follows.

$$F \cdot C + \overline{F} \cdot \overline{C} = (F \cdot C + F \cdot \overline{C}) + (\overline{F} \cdot \overline{C} + F \cdot \overline{C}) = F + \overline{C} \quad (1)$$

As seen from the logical formula (1), this condition is expressed by a logical sum of the clock synchronization-unestablished information $\overline{C}$ sent out from the clock synchronization circuit 44 and the frame synchronization-established information F sent out from the frame synchronization circuit 45.

Through opening or closing the gate of the AND circuit 49 in accordance with this logical sum the switch 51 is turned on or off in accordance with the output $d$ from the control pulse generating circuit 46 for designating a predetermined time zone and outputs F, C both synchronization circuits 44 and 45, thereby to save the power supplied from the power source 52 to the radio receiver 41. It is to be noted that the switch 51 can be readily constructed of, for example, usual relays, and that the other circuits except for the radio receiver 41 are supplied with power from the power source 52 through connection lines not shown.

Figure 9:
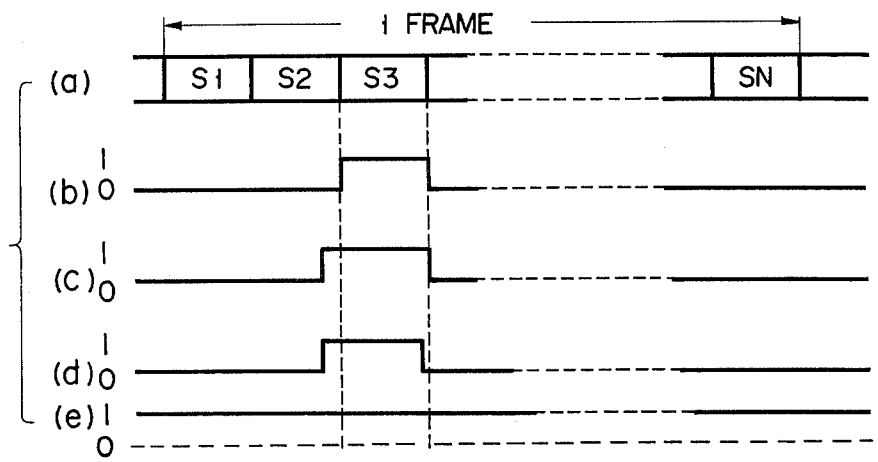
FIG. 9 is a view for explaining the operation of the receiving apparatus shown in FIG. 4.

Hereinafter, the operation of the above-constructed receiving apparatus according to the above-mentioned embodiment is explained for each type of the receiving condition with reference to FIG. 4. Where the receiving condition is "good", the clock synchronization and frame synchronization are both achieved and therefore the input signals to be supplied to the OR circuit 50 are C and F. Therefore, the output from the OR circuit 50 is applied to one input terminal of the AND circuit 49. On the other hand, a predetermined time zone designating signal generated from the control pulse generating circuit 46 in accordance with the time series determined by this circuit 46 the control pulse generating circuit 46 driven by the clock signal $b$ in accordance with the frame synchronizing position signal $c$, that is to say, the control pulse $d$, is also applied to the other terminal of the AND circuit 49. Accordingly, a logical product is obtained in the AND circuit 49, which as a result output level is "1". Since the output of "1" level from the AND circuit 49 is supplied to the switch 51, this switch makes on and off operations. Accordingly, the power voltage supply to the radio receiver 41 is cut off. It is now assumed that the subscriber's receiving apparatus (individual code) belongs to a group corresponding to, for example, a subframe $S_3$ as shown in FIG. 9(a). In this case, this receiving apparatus has only to be made fully operative only during the period corresponding to the subframe $S_3$ as shown in FIG. 9(b). (Note that where the subframe $S_3$ has no synchronizing signal denoting, for example, a group number, said period includes a term having the frame synchronizing signal, but since the receiving apparatus has only to be similarly made fully operative also during this term, explanation will be hereinafter made only of the subframe). Accordingly, the control signal $d$ has only to have a waveform corresponding to FIG. 9(b) on the assumption that, for example, its logical "0" level designates the on-operation of the switch 51 and its logical "1" level the off-operation of the switch 51. Accordingly, the switch 51 is turned on when the output of the AND circuit 49 comes to have "1" level and is inversely turned off when the output of the AND circuit 49 comes to have "0" level. Where a small length of time is required from the time when the switch 51 is turned on upon receipt of the output of the AND circuit (i.e. control pulse $d$) $d$ until the receiving apparatus is fully operative, it is necessary to allow the front porch of the signal $d$ to go ahead of the starting point of the subframe $S_3$ as shown in FIG. 9(c). Where, conversely, even when the switch 51 is turned off, the receiving apparatus continues to be transitorily operative, the back porch of the signal $d$ can be made to go ahead of the terminating point of the subframe $S_3$ with estimation of a time length portion exceeding the frame. The point is that the switch 51 should in principle be kept "on" only during a minimum length of time, i.e., a minimum period in which the subframe $S_3$ is receivable. This principle applies in common to the other receiving apparatuses as later described according to other embodiments of the invention.

Since, as above described, power is supplied from the power source 52 to the radio receiver 41 during the on-operation of the switch 51, the necessary information signal including the identification individual code during the subframe period is extracted from the reproduced digital signal $a$ from the radio receiver 41 by the signal processor 43. That is to say, where the individual number of the receiving apparatus is disposed in the subframe $S_3$ shown in FIG. 9(a) together with the "call" code, this "call" code is detected and the resulting detection signal $n$ is applied to the buzzer 48 to cause it to call the subscriber carrying the receiving apparatus thereby to cause him to recognize the fact that there is a "call".

Where the receiving condition is a "bad", neither frame nor clock synchronizations are achieved, the receiving apparatus is kept in an unreceivable condition.

Accordingly, though the signal processor 43 operates, it fails to detect the information signal successfully. In this case, however, as above described, the outputs from the clock and frame synchronization circuits 44, 45 are $\overline{C}$ and $\overline{F}$, respectively, and therefore the clock synchronization-unestablished information signal $\overline{C}$ is applied to the AND circuit 49 through the OR circuit 50. As a result, the gate of the AND circuit 49 is opened during a period corresponding to a time zone designated by the control signal $d$ to permit the output from the AND circuit 49 to be applied to the switch 51. Since, accordingly, the switch makes on and off operations as in the case where the receiving condition is "good" so that the power voltage to be supplied to the radio receiver 41 is cut off. Accordingly, power is supplied from the power source 52 to the radio receiver 41 through the switch 51 only during the predetermined period designated by control pulsed. For this reason, the receiving apparatus performs power saving in accordance with the time series of the control signal $d$.

Where the receiving condition is "intermediate", the outputs from the clock synchronization circuit 44 and frame synchronization circuit 45 are C and $\overline{F}$, respectively. Since, therefore, neither the OR circuit 50 nor the AND circuit 49 are opened, since the output of the AND circuit 49 has "0" level the switch 51 is kept "on" and as a result power is always supplied from the power source 52 to the radio receiver 41.

Since the "intermediate" receiving condition is the one in which the frame synchronization is unestablished and the clock synchronization is established, the signal processor 43 fails to detect the identification individual code successfully if it is made operative. Since, however, the "intermediate" receiving condition is a very promising condition for establishment of synchronization of the receiving apparatus, all sections of the receiving apparatus are kept operative, as shown in FIG. 9(e), over an entire length of one frame shown, for example, in FIG. 2.

As above described, according to this embodiment, except for the "intermediate" receiving condition wherein the extent to which the synchronization is achieved is "intermediate", part of the receiving apparatus can be selectively made operative or inoperative in both the "good" and "bad" receiving conditions, which enables the power consumption to be decreased. Particularly in the case where the power source 52 is a battery, this is effective since the battery has a limited amount of power. The receiving apparatus of this invention is possessed by each subscriber since each subscriber should catch a "call" signal from the key station. Its power consumption depends always on the receiving condition. Thus, if the receiving condition is "intermediate", the receiver is operated continuously, thereby putting the apparatus into synchronism with the receiver as quickly as possible. If the receiving condition is "good", the receiver is operated only for a predetermined period since the apparatus can receive information signals without fail, thereby to save power. If the receiving condition is "bad", the apparatus fails to receive information even if the receiver is operated all the time. In this case, the receiver is operated only for a predetermined period, thereby to save power. Thus, the cell in the receiving apparatus can serve for a long time.

Figure 10:
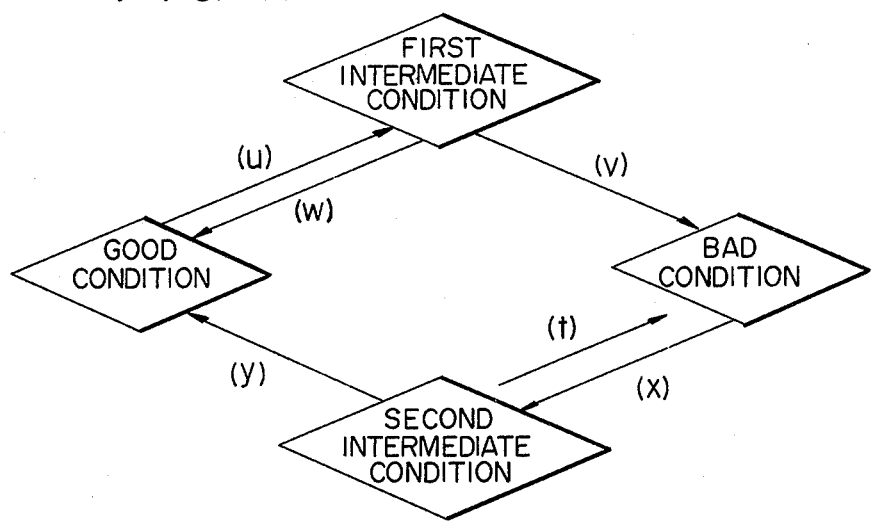
FIG. 10 is a receiving condition transition view for explaining the receiving apparatus according to another embodiment of the invention.
Figure 11:
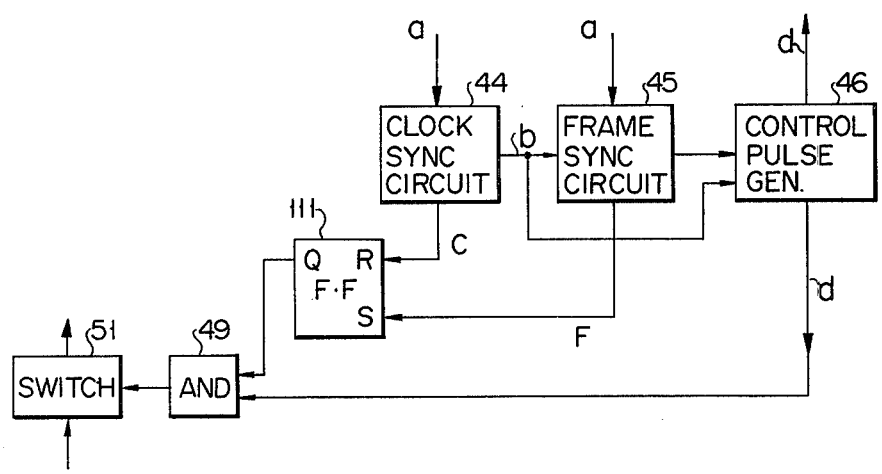
FIG. 11 is a block circuit diagram showing a main part of the receiving apparatus of FIG. 10 allowed to operate in accordance with the transition view shown in FIG. 10.
Figure 12:
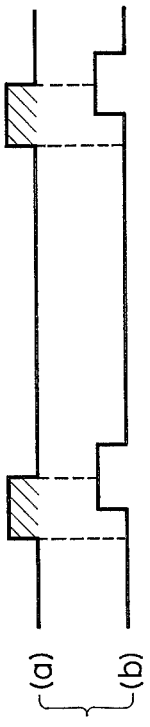
FIG. 12 shows signal waveforms for explaining a further developed operation of the receiving apparatus shown in FIG. 11.

FIGS. 10, 11 and 12 show another embodiment of the invention. In this embodiment, power saving is performed not only in the case where the receiving condition is "good" and "bad" but performed also in the case where the receiving condition is "intermediate", under specific conditions in accordance with the same time series as in the case of the "good" and "bad" receiving conditions in the same manner as that mentioned in connection with the first embodiment.

For this reason, the "intermediate" receiving condition is further classified into two types — "first intermediate" and "second intermediate" conditions. That is, as shown in FIG. 10, the "first intermediate" condition indicates a condition obtained as a result of transition from the "good" (C·F) condition wherein the clock and frame synchronizations of the receiving apparatus to the condition (C·$\overline{F}$) wherein only the frame synchronization is unestablished, whereas the "second intermediate" condition indicates a condition obtained as a result of transition from the "bad" condition ($\overline{C}$·$\overline{F}$) wherein both the clock and frame synchronizations are unestablished to the condition (C·$\overline{F}$) wherein only the clock synchronization is established.

The "first intermediate" condition is, in other words, a transition condition which, as shown in FIG. 10, is in course of transition from the "good" to the "bad" condition by way of courses (U) and (V) but which is sometimes returned to the "good" condition by way of a course (W). The latter phenomenon is relatively high in the frequency of occurring in usual radio circuits, and therefore in such a transistion condition it is unnecessary to stop the power saving operation of the receiving apparatus. Therefore, in the case of the "first intermediate" condition the power saving operation is performed in the same manner as in the case of the "good" and "bad" conditions.

However, where the "bad" condition reached as a result of transition by way of the courses (U) and (V) is transited through restoration of the clock synchronization to the "second intermediate" condition by way of a course (X), the power saving operation is stopped and all sections of the receiving apparatus are always kept operative until the "second intermediate" condition is returned to the "bad" condition by way of a course ($t$) or is transited to the "good" condition by way of course ($y$).

By so doing, power saving can be performed to a greater extent than in the case of the first-mentioned embodiment. A construction of the receiving apparatus according to this second embodiment is shown in FIG. 11. The receiving apparatus of FIG. 11 is different from that of FIG. 4 in that the OR circuit 50 of FIG. 4 is replaced by an R-SFF 111 (Reset-Set Flip-Flop). The detection of the receiving apparatus depends upon the extent to which the synchronization is achieved. The same parts and sections required for explanation, or the parts and sections having the same functions, as those of FIG. 4 are denoted by the same reference numerals, and the remaining are omitted.

The flip-flop 111 is set by the frame synchronization-established information F applied to its set terminal S from the frame synchronization circuit 45, and reset by the clock synchronization-established information C applied to its reset terminal R from the clock synchronization circuit 44. The flip-flop 111 gives forth a logical "1" level signal while being set, and a logical "0" level signal while being reset.

The clock synchronization-established information C is given forth when the clock synchronization circuit 44 has been brought from the synchronization-unestablished condition to the synchronization-established condition. According to the receiving condition transition view of FIG. 10, this corresponds to the course (x). In this embodiment, therefore, the power saving operation of the receiving apparatus is stopped only under a condition wherein the receiving condition is in course of transition from the "bad" to the "good" condition by way of the courses (x) and (y), i.e., only under the "second intermediate" condition.

By the way, it may happen that even in the case where the clock synchronization is normally maintained, the frame synchronization is missed due to erroneous operations of, for example, a hardware on the transmitting or receiving side, or due, though rarely, to erroneous pull-in phenomena and this missed condition persists during a considerable length of time. This condition corresponds to the "first intermediate" condition shown in FIG. 10. Where, also in such a case, the receiving apparatus is made to continue the power saving operation in accordance with a specific time series, the switch 51 makes the on and off operations, as shown in FIG. 12, in accordance with the time series shown in FIG. 12(b) with respect to the signal (a) coming from the transmitting side in accordance with a specific time series.

Figure 13:
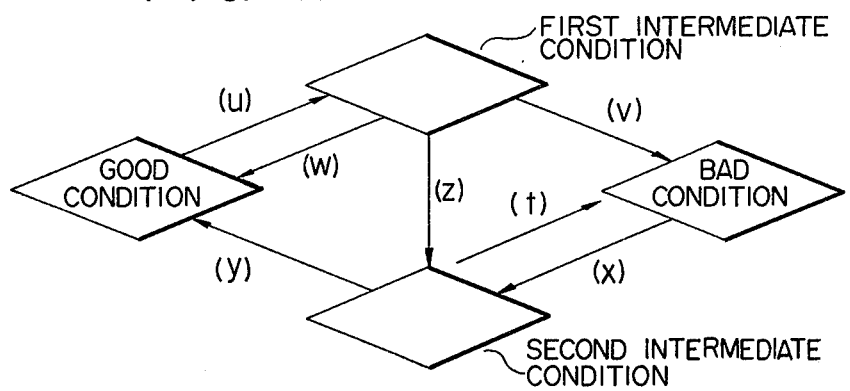
FIG. 13 is a receiving-condition transition view for explaining said further developed operation of the receiving apparatus shown in FIG. 11.
Figure 14:
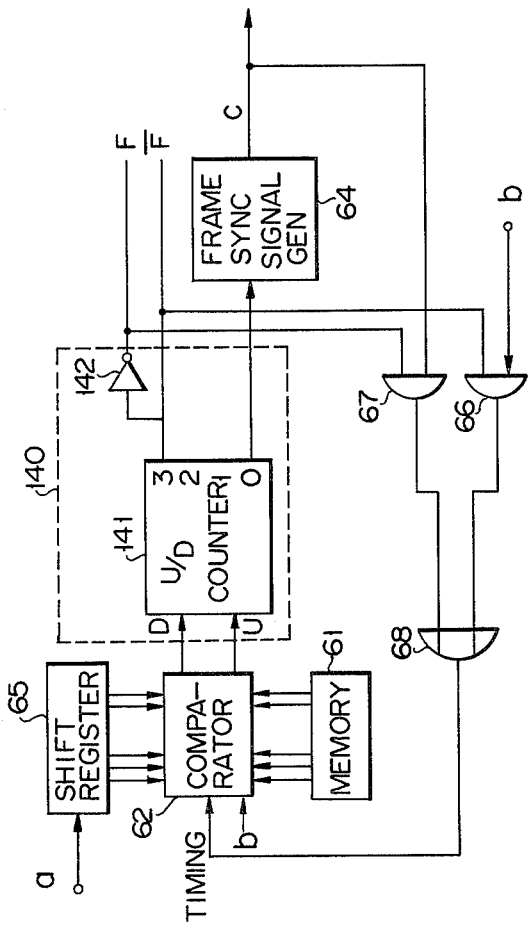
FIG. 14 is a block circuit diagram showing a frame-synchronization circuit of the receiving apparatus shown in FIG. 11.

There arises a problem, here, that the receiving apparatus placed under such circumstances permanently fails to achieve the frame synchronization. In this case, if, in case the frame synchronization circuit 45 makes erroneous detection of frame synchronizing signals with a frequency higher than specified, such an operation as permits the receiving condition to be transited from the "first intermediate" to the "second intermediate" condition by way of a course (z) is carried out in advance as shown in a receiving condition transition view of FIG. 13, the above-mentioned problem will be solved. In this embodiment, such operation is realized by allowing a set signal to be supplied to the set terminal of the flip-flop 111 when the number of said detection errors of the synchronizing signals exceeds a specified value. That is to say, said such operation can be realized by using a frame synchronization circuit 45 having involved therein such a frame synchronization error-detection circuit 140. FIG. 14 shows a circuit prepared by incorporating into the frame synchronization circuit 45 of FIG. 4 a frame synchronization error-detection counter 141 for example, an up-down counter 141 whose outputs are 0, 1, 2 and 3. The counter 141 is connected to the output terminal of a comparator 62, and counts up upon receipt of a coincidence output from the comparator 62 and counts down upon receipt of a noncoincidence output from the comparator 62. When the count of the counter 141 becomes, for example, 3, the counter 141 produces an output, which becomes the frame synchronization-unestablished signal $\overline{F}$. When the count of the up-down counter 141 is 0, the output from the counter 141 is applied to a frame synchronization signal generator 64, which produces the frame synchronizing position signal c. Where the frame synchronization is established, the frame synchronization-established signal F is produced, so that the frame synchronizing position signal c is fed to the comparator 12 through an AND circuit 67 and an OR circuit 68 to become a timing signal at the time when the comparator 62 makes a comparing operation. Where the frame synchronization is unestablished, the clock signal b is supplied to the comparator 62 through an AND circuit 66 and the OR circuit 68 to become a timing signal at the time when the comparator 62 makes a comparing operation.

FIGS. 15 to 18 show still another embodiment (third embodiment) of the invention. In the above-mentioned first and second embodiments, the receiving apparatus performs the power saving operation in accordance with each type of the receiving conditions. In contrast, in this embodiment, the time series in accordance with which the switch 51 makes the on and off operations is classified into three types of modes — mode 1, mode 2 and mode 3 thereby to carry out the power saving operation of the receiving apparatus.

Figure 15:
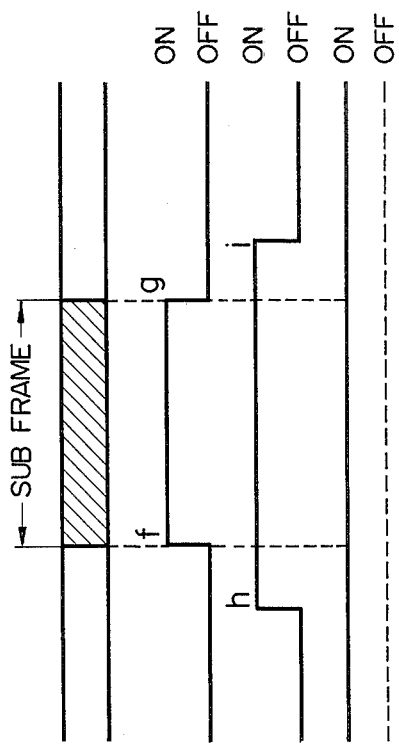
FIG. 15 is a view related to the receiving apparatus according to still another embodiment of the invention and intended to explain the switching operation performed in accordance with three types of modes.

As shown in FIG. 15, the mode 1 indicates a power-supplied condition wherein the receiving apparatus is made fully operative by causing the switch 51 to be made "on" over an entire length of the time zone independently of a subframe (an oblique lines-drawn section) corresponding to a group to which the subscriber belongs. The mode 2 indicates a power-supplied condition wherein the receiving apparatus is made operative by causing the switch 51 to be made "on" only during a period corresponding to said subframe. The mode 3 indicates a power-supplied condition wherein the receiving apparatus is made operative by causing the switch 51 to be made "on" during a period (including not only the period corresponding to said subframe but also additional periods added to this subframe period in front and back thereof) longer than that of the mode 2 but shorter than that of the mode 1.

According to the classification of said power supply modes, it will be seen that the modes 1 and 2 are already used to cause the switch 51 of, for example, the first or second embodiment to make the on and off operations. In this embodiment, the modes 1, 2 and 3 are used, by way of example, to effect power supply to the receiving apparatus in accordance with the power supplied condition transition view shown in FIG. 16. When, for clarification, the modes 1, 2 and 3 are made to correspond to the types of the receiving conditions of the second embodiment, the mode 2 shown in FIG. 16 corresponds to the "good" receiving condition (C·F), the mode 3 shown in FIG. 16 corresponds to the "bad" receiving condition ($\overline{C}$·F), and the mode 1 shown in FIG. 16 corresponds to the "intermediate" receiving condition (C·$\overline{F}$), and these power supply modes are used in a manner varied with the variation in the receiving condition, in accordance with the arrows shown in FIG 16. In this case, however, when the receiving apparatus is made operative, the mode 1 is used during a specific period to permit the receiving apparatus to receive all signals until the clock and frame synchronizations are established. Further, the transition from the mode 2 to the mode 1 and the transition from the mode 3 to the mode 1 are effected when the number of the frame synchronization errors exceeds a specific value. The condition for these transitions is the same as that under which the receiving condition is transited from the "first intermediate" to the "second intermediate" condition by way of the course (z) shown in FIG. 13, i.e., referred to in the second embodiment. Accordingly, if the number of the frame synchronization errors is less than said specific value, the receiving apparatus is maintained in the power-supplied condition corresponding to the mode 1 or 2.

Figure 17:
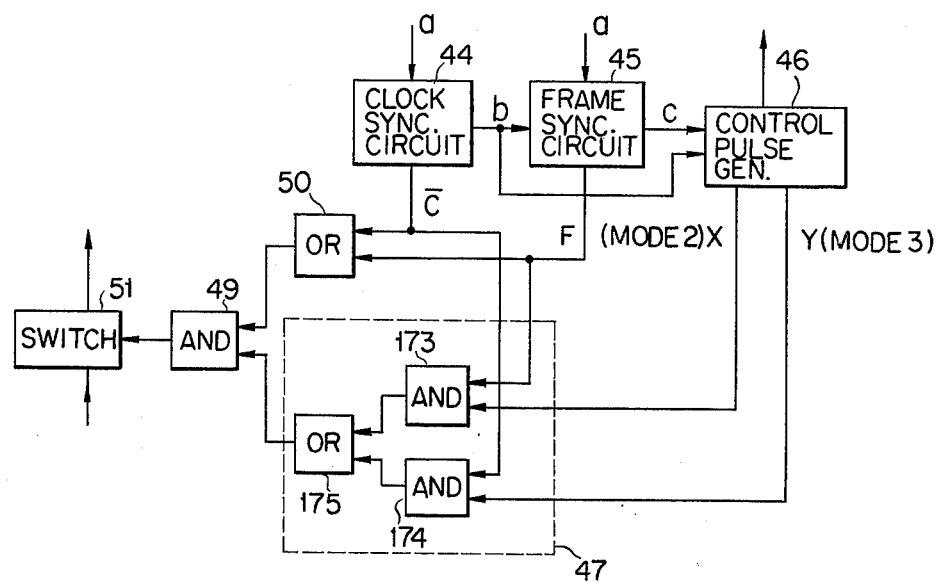
FIG. 17 is a block circuit diagram showing a main part of an example of the receiving apparatus of FIG. 15 allowed to operate in accordance with the power-supplied condition transition view of FIG. 16.

The above-mentioned will hereinafter be explained referring to FIG. 17. In FIG. 17, a portion different from FIG. 4 is shown as a main part of the receiving apparatus, and the same part and section required for explanation, or the part and sections having the same function, as those of FIG. 4 are denoted by the same reference numerals. As shown in FIG. 17, the control pulses X and Y generated from the control pulse generating circuit 46 for designating an unnecessary time zone are switch control signals corresponding to the modes 2 and 3, respectively. The switch control signal corresponding to the mode 2 causes an AND circuit 173 to be opened or closed in accordance with the frame synchronization detecting output F from the frame synchronization circuit 45, while the switch control signal corresponding to the mode 3 causes an AND circuit 174 to be opened or closed in accordance with the clock synchronization detecting output $\overline{C}$ from the clock synchronization circuit 44. Thus, the outputs from the AND circuits 173, 174 are supplied to the AND circuit 49 through an OR circuit 175. A reference numeral 47 denotes a switch control signal generating circuit for generating a switch control signal of predetermined period upon receipt of the control pulse from the control pulse generating circuit 46 and the outputs of both the clock synchronization circuit 44 and the frame synchronization circuit 45.

Figure 18:
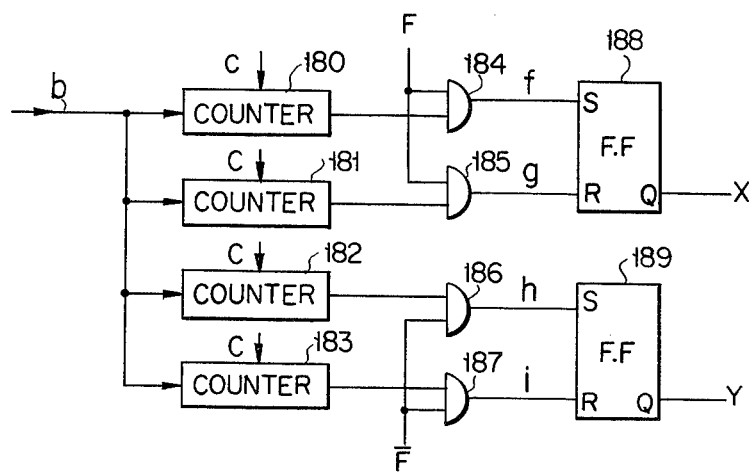
FIG. 18 is a block circuit diagram of a control pulse generating circuit of the receiving apparatus shown in FIG. 17.

The control pulse generating circuit 46 has fundamentally the same construction as that of the circuit shown in FIG. 17 and its part and sections required for explanation are shown in detail in FIG. 18. The circuit 46 is provided with counters 180, 181, 182 and 183 driven by the clock signal $b$ from the clock synchronization circuit 44 to detect the rising and falling points of time of each of the modes 2 and 3 in accordance with the frame synchronizing position signal $c$ from the frame synchronization circuit 45.

The counters 180, 181, 182 and 183 are n-scale counters the count of each of which is determined in accordance with the position information of the frame synchronizing signal included in the frame synchronizing position signal $c$. That is to say, for example, in the counter 180 it is determined how many bits should be counted from the position of the frame synchronizing signal to produce a counted-up output, namely, when n-counts are made from the rising point of time of the frame synchronizing signal, the counter 180 produces a counted-up output. The outputs from the counters 180, 181, 182 and 183 are supplied to AND circuits 184, 185, 186 and 187 provided in corresponding relationship thereto. The frame synchronization-established information F and the frame synchronization-unestablished information $\overline{F}$ from the frame synchronization circuit 45 are supplied to AND circuits 184 and 185, respectively, the outputs $f$ and $g$ from which are supplied to set and reset terminals of a flip-flop 188, respectively. Similarly, the frame synchronization-established information F and the frame synchronization-unestablished information $\overline{F}$ are supplied to AND circuits 186 and 187, respectively, the outputs $h$ and $i$ of the AND circuits 186, 187 from which are supplied to set and reset terminals of a flip-flop 189. Accordingly, as shown in FIG. 18, the flip-flop 188 is set and reset by the signals generated from the counters 180 and 181, respectively, in accordance with the frame synchronization to generate the control pulse X or a switch control signal. Similarly, the flip-flop 189 is set and reset by the signals generated from the counters 182 and 183, respectively, in accordance with the frame synchronization to generate the control pulse Y or a switch control signal.

In the receiving apparatus having the above-mentioned construction, where the receiving condition is "good" and the output of the frame synchronization circuit 45 is F, the gates of the AND circuits 173 and 174 are opened. Since, therefore, the signal X constituting the output of the control pulse generating circuit 46 is supplied to the switch 51, the power saving operation is performed in accordance with the mode 2. Also where the receiving condition is "bad" and the output of the clock synchronization circuit 44 is $\overline{C}$, the gates of the AND circuits 173 and 174 are opened and therefore the signal Y constituting the output of the control pulse generating circuit 46 is supplied to the switch 51. As a result, the power saving operation is performed in accordance with the mode 3.

However, where the clock synchronization is normally achieved and the frame synchronization errors occur in the number larger than specified, the outputs of the clock and frame synchronization circuits 44 and 45 are C and $\overline{F}$, respectively. Therefore, the gate of the AND circuit 49 is not opened. Accordingly, the switch 51 is turned on to permit power supply to the receiving apparatus in accordance with the mode 1.

Figure 16:
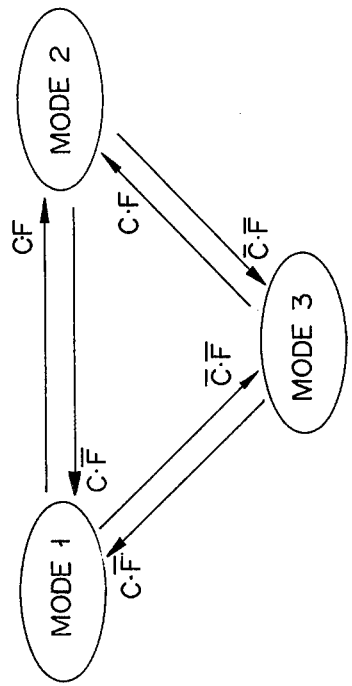
FIG. 16 is a power-supplied condition transition view for charging-over the three types of modes in accordance with the receiving conditions.

If, in the receiving apparatus, the transition of the power-supplied conditions shown in FIG. 16 is effected in accordance with the above-mentioned operation the receiving apparatus will be able to perform the power saving to a maximum extent not only when the receiving condition is "good", namely, corresponds to the mode 2 but, also in other receiving conditions, be able to undergo the full synchronization reliably. Accordingly, the power saving becomes possible. Thus, the receiving performance of the receiving apparatus can be enhanced.

It will be understood from the following description that it is advantageous that in this embodiment the receiving apparatus is made to operate in accordance with the mode 3 during that period longer than the period of the mode 2 which includes the period of one subframe corresponding to a group to which the subscriber belongs.

That is, the clock synchronization circuit of the invention is of the synchronization system wherein where the receiving condition is "good", the clock signal source on the receiving side is controlled by the clock signal on the transmitting side as above described; but where the intensity of the receiving field is decreased, the receiving side ceases to follow the clock signal from the transmitting side and independently generates the clock signal whose phase is the same as that obtained when the receiving condition is "good". According to this synchronization system, also during a period in which the receiving field intensity is decreased, or the power saving is performing, the receiving side can be kept synchronized with the transmitting side over a relatively long period of time.

However, when the period in which a clock signal component fails to be extracted from the clock signal on the transmitting side is too long, the clock signals on the transmitting and receiving sides become out of phase due to the inherent frequency difference between both clock signals due to the difference, for example, in frequency accuracy between the clock signal sources of the transmitting and receiving sides. On the other hand, in the frame synchronization circuit, the synchronization is gained in accordance with the phase of the clock signal on the transmitting side and in accordance with the point of time at which a specific frame synchronizing signal is detected, and further also in the frame synchronization circuit arrangement is made as in the clock synchronization circuit so that the receiving timing of the receiving apparatus is not varied even in the case where the frame synchronizing signal fails to be detected as a result of, for example, the reception of erroneous code patterns. Accordingly, when it is now assumed that after the occurrence of phase displacement after a long period, the frame synchronizing signal be detected at an erroneous position with respect to the subframe having the necessary information to the receiving apparatus, the receiving apparatus is thereafter made to perform the receiving apparatus in accordance with the pattern of that frame synchronizing signal. For this reason, where the mode 2 continues to be used, the receiving apparatus is thereafter disabled from receiving the necessary information. Through causing, therefore, the receiving apparatus to operate during a period longer than the period of the necessary subframe as in the case of the mode 3, the receiving apparatus detects the frame synchronizing signal at a correct position with respect to the subframe having the necessary information and thus is brought to a synchronization-established condition.

Note, here, that the period in which the switch is turned on in accordance with the mode 3 corresponds to the amount of the phase displacement between the clock signals on the transmitting and receiving sides. It is now assumed that $f_0$ represents the clock frequency on the transmitting side, $f_i$ the clock frequency of the clock source on the receiving side and $\alpha$ the difference between the clock frequencies on the transmitting and receiving sides. Then, where the clock signal component of the clock signal from the transmitting side fails to be extracted on the receiving side during a period $t$, the clock signals on the transmitting and receiving sides are $n = \alpha f_0 \cdot t$ (bit) out of phase. For example, if $\alpha = 10^{-6}$ and $f_0 = 1000$ Hz, $n = 10^{-3}t$. Therefore, if $t = 1000$ seconds, the phase displacement is made by $n = \pm 1$ bit, and if $t = 10000$ seconds, the phase displacement is made by $n = \pm 10$ bits. Accordingly, the "on" period in the mode 3 can be set with respect to the "on" period in the mode 2 in consideration of the frequency accuracy of the clock source, the clock frequency and the length of the switch holding period. Where, upon setting the "on" period, the clock frequency on the receiving side is higher than that on the transmitting side, the starting point of the "on" period is advanced; and conversely where, upon setting the "0" period, the clock frequency on the receiving side is lower than that on the transmitting side, the ending point of the "on" period is delayed. Further, where it is unknown whether the clock frequency on the receiving side is higher or lower, or where the frequency relationship between the transmitting and receiving sides is likely to be reversed due to, for example, the variation in temperature, the "on" period has only to be prolonged in both directions.

Figure 19:
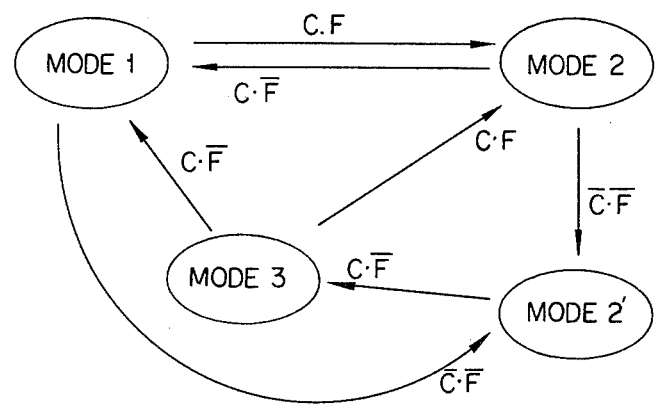
FIG. 19 is another power-supplied condition transition view.

FIG. 19 is a power-supplied condition transition view showing another embodiment of the invention using the mode 3. In the fourth embodiment, a new mode 2' having the same time series as that of the mode 2 is provided. The mode 2' of this embodiment corresponds to the "bad" receiving condition ($\overline{C}\cdot\overline{F}$) of said second embodiment, the mode 3 corresponds to the "first intermediate" receiving condition, the mode 1 corresponds to the "second intermediate" receiving condition, and the mode 2 corresponds to the "good" receiving condition. This fourth embodiment is different from FIG. 16 in the following respects. When the clock synchronization is missed while the receiving apparatus is operating in accordance with the mode 2, the receiving apparatus is changed-over from the mode 2 to the mode 2', and when the clock synchronization is restored using the mode 2', the receiving apparatus is changed-over from the mode 2' to the mode 3. This mode 3 corresponds to the condition ($C\cdot\overline{F}$) wherein only the clock synchronization is established to start the detection of a frame synchronizing signal. Accordingly, when the frame synchronization is established using the mode 3, the receiving apparatus is changed-over from the mode 3 to the mode 2. Where, conversely, as explained referring to FIG. 14, the frame synchronization errors have been detected in the number larger than specified, the receiving apparatus is changed-over from the mode 3 to the mode 1.

Figure 20:
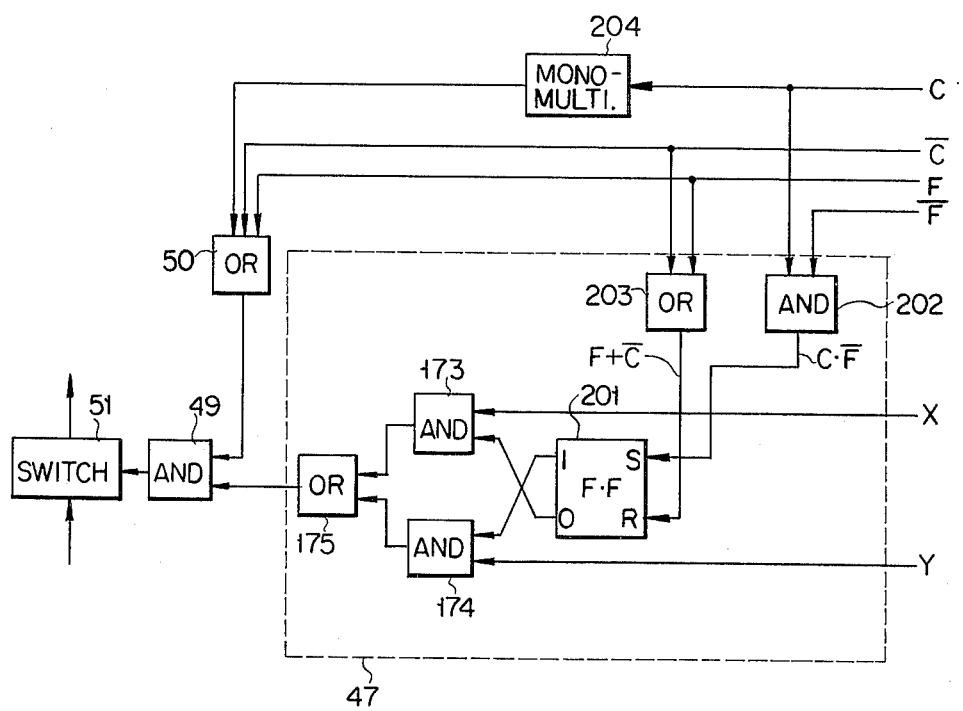
FIG. 20 is a block circuit diagram showing a main part of another example of the receiving apparatus of FIG. 19 allowed to operate in accordance with the power-supplied condition transition view of FIG. 19.

FIG. 20 shows a circuit construction of the receiving apparatus for realizing the above-mentioned operation. That is, in FIG. 20 there is shown in detail the switch control signal generating circuit 47 different from that shown in FIG. 17. The same parts and section required for explanation, or the parts and sections having the same functions, as those referred to in the above-mentioned first to third embodiments, are denoted by the same reference numerals.

Referring to FIG. 20, the gate of the AND circuit 173 is operated upon receipt of the reset output signal from the R-SFF 201 (reset set flip-flop) and the gate of the AND circuit 174 is operated upon receipt of the set output signal from the R-SFF 201. The flip-flop 201 is set when the set terminal thereof is supplied with the output from an AND circuit 202 for obtaining a logical product $C\cdot\overline{F}$ from the clock synchronization-established information C and the frame synchronization-unestablished information $\overline{F}$, to open the gate of the AND circuit 174 by the set output from the flip-flop 201. The flip-flop 201 is reset when the reset terminal thereof is supplied with the clock synchronization-unestablished information $\overline{C}$ or frame synchronization-established information F through an OR circuit 203, to open the gate of the AND circuit 173 by the reset output from the flip-flop 201. The OR circuit 50 for causing operation of the gate of the AND circuit 49 is supplied with the output from a one shot multivibrator 204 as well as with said $\overline{C}$ and $\overline{F}$. The one shot multivibrator 204 is started only at the point of time when the clock synchronization information is changed from $\overline{C}$ to C, to supply a logical "1" level output to the OR circuit 50 during a specific period of time, and is so designed that when the receiving apparatus is brought to the "intermediate" receiving condition, the switch 51 can be changed-over to the mode corresponding to the immediately preceding receiving condition. That is to say, when, under the condition wherein the receiving condition is "good" and the mode 2 is executed, the frame synchronization is missed to cause the logical product $C\cdot F$ to be changed into the logical product $C\cdot\overline{F}$, the gate of the AND circuit 49 is closed to cause the switch 51 to be changed-over to the mode 1. When, under this condition, the frame synchronization is gained to cause the logical product $C\cdot\overline{F}$ to be changed into the logical product $C\cdot F$, the flip-flop 201 is reset by the information signal F to cause the power-supplied condition to be returned to the condition corresponding to the mode 2. But when, in the power-supplied condition corresponding to the mode 1, the frame synchronization is missed to cause the logical product $C\cdot\overline{F}$ to be changed into the logical product $\overline{C}\cdot\overline{F}$, the power-supplied condition is shifted to the condition corresponding to the mode 2' (in this case, however, the flip-flop 201 is reset by the information signal $\overline{C}$ and therefore the power-supplied condition is the same as that corresponding to the mode 2). This condition is the one which is similarly arrived at also in the case where the clock synchronization is missed under the power-supplied condition corresponding to the modes 2 and 2' to cause the logical product C·$\overline{\text{F}}$ to be changed into the logical product $\overline{\text{C}}$·$\overline{\text{F}}$. When, in the power-supplied condition corresponding to the mode 2', the clock synchronization is regained to cause the logical product $\overline{\text{C}}$·$\overline{\text{F}}$ to be changed into the logical product C·$\overline{\text{F}}$, the flip-flop 201 is set by the output of the AND circuit 202 to cause the power-supplied condition to be shifted to the one corresponding to the mode 3. At this time, a change from $\overline{\text{C}}$ to C, of the clock synchronization detection output causes the one shot multivibrator 204 to operate to open the gate of the AND circuit 49 during a specified period of time, so that the receiving apparatus operates in accordance with the mode 3. If, however, at the time when the output of the one shot multivibrator 204 has become "0", the frame synchronization is regained to obtain the logical product C·F, the flip-flop 201 will be reset by the information signal F to open the AND circuit 173, so that the power-supplied condition will be shifted to the one corresponding to the mode 2. However, where the frame synchronization is still kept not regained after the lapse of a specific length of time (this corresponds to the case where the frame synchronizing signals of the number larger than specified have been erroneously detected), the synchronization is kept in the condition corresponding to the logical product C·$\overline{\text{F}}$. Since, in this case, the gate of the AND circuit 49 is closed, the power-supplied condition is brought to the one corresponding to the mode 1.

Where, in the power-supplied condition corresponding to the mode 1, the logical product C·$\overline{\text{F}}$ is changed into the logical product $\overline{\text{C}}$·$\overline{\text{F}}$, the gate of the AND circuit 49 is opened by the information signal $\overline{\text{C}}$ to reset the flip-flop 201, so that the power-supplied condition is shifted to the one corresponding to the mode 2'.

As above described, in the fourth embodiment, where the receiving condition is "intermediate", the receiving apparatus is made to operate in accordance with the mode 3 for causing power supply during a longer period of time than that of the mode 2 corresponding to the "good" receiving condition. Therefore, the power saving can be performed while the communication relationship between the transmitting and receiving sides is reliably maintained by executing the advantageous synchronization system of the invention.

Figure 21:
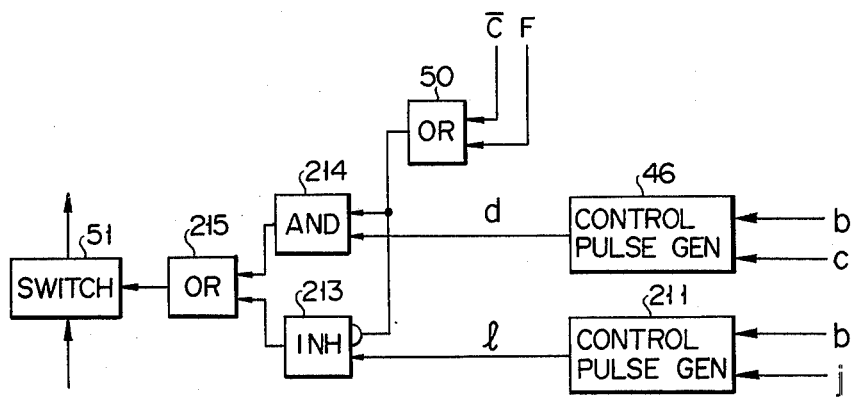
FIG. 21 is a block circuit diagram showing a main part of the receiving apparatus according to a further embodiment of the invention.

In the above-mentioned first to fourth embodiments, as will be understood from the mode 2 or 3, explanation was made of the power saving performed within a period corresponding to one frame. Accordingly, where the receiving apparatus is made to operate in accordance with the mode 1, this was that power supply mode free from a frame construction in which power is continuously supplied to the receiving apparatus until the synchronization is established. Hereinafter, a further embodimeht (fifth embodiment) of the invention is described referring to FIGS. 21 and 23. FIG. 21 shows a main part of the receiving apparatus capable of performing the power saving more effectively than in the case of the receiving apparatus according to the above-mentioned embodiments, and principally shows different parts and sections from FIG. 4.

Figure 22:
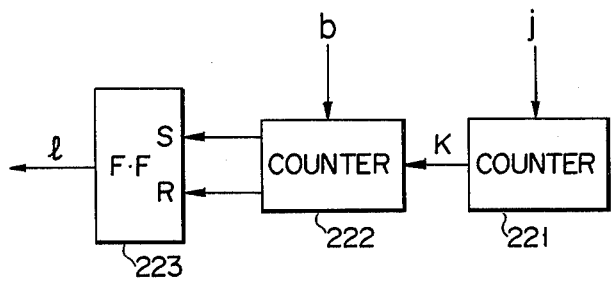
FIG. 22 is a detailed block circuit diagram showing the control pulse generating circuit of FIG. 21.
Figure 23:
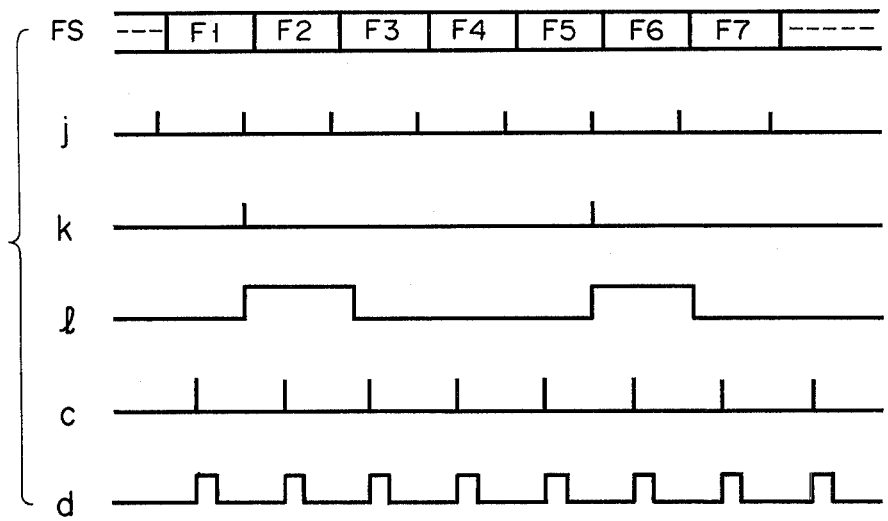
FIG. 23 shows signal waveforms for explaining operation of the receiving apparatus shown in FIG. 21.

Referring to FIG. 21, a reference numeral 211 denotes a control pulse generating circuit for generating a signal l for designating unnecessary frames of such a successive frame configuration FS as shown in FIG. 23 and differs from the control pulse generating circuit 46 for generating a signal for designating unnecessary time zones of the time domain corresponding to one frame. In this designator 211, as shown in FIG. 22, a pulse signal j generated from the frame synchronization circuit 45 in units of frame periods is counted down by a counter 221; and the counted-down output signal k is supplied to a counter 222 to cause it to be reset so as to count the clock signal b; and the output of the counter 222 is supplied to a flip-flop 223 to cause it to be driven, whereby the designator 221 repeatedly generates for each several-frame period the switch signal l whose period covers an entire length of one frame to supply the signal l to an inhibitor 213.

The control pulse d generated from the control pulse generating circuit 46 is supplied to an AND circuit 214. The output from the OR circuit 50 is supplied to one input terminal of the AND circuit 214 and also to the inhibiting terminal of the inhibitor 213. The outputs from both circuits 213 and 214 are selectively supplied to the switch 51 through an OR circuit 215.

The output time charts of said respective circuits are as shown in FIG. 23.

Accordingly, where the receiving condition is "good" or "bad", the synchronization is kept in the condition corresponding to the logical product C·F. Therefore, the gate of the AND circuit 214 is opened (in this case, the input of the inhibitor 213 is inhibited), so that the signal d for causing the switch 51 to be kept "on" during a period corresponding to a specific subframe of one frame is applied from the control pulse generating circuit 46 to the switch 51. In contrast, where the receiving condition is "intermediate", the synchronization is kept in the condition corresponding to the logical product C·$\overline{\text{F}}$. Therefore, the gate of the AND circuit 214 is closed, so that the switch signal l shown in FIG. 23 is applied from the control pulse generating circuit 211 to the switch 51 through the inhibitor 23.

In this embodiment, the switch 51 causes power supply so as to cause the receiving apparatus to continuously operate over an entire length of every fifth frame, for example, over an entire length of each of a frame $F_2$, $F_6$, ... of the frame configuration $F_S$ of FIG. 23. Since the power supply is effected as such, the power saving can be executed by causing the switch 51 to be turned off during a period corresponding to, for example, a length of frames $F_3$ to $F_5$ even under the condition wherein the receiving apparatus is kept waiting for the pull-in operation and therefore the position of a subframe corresponding to the subscribers's group can not correctly be judged.

The control system for permitting power supply to the receiving apparatus in accordance with such a frame configuration as shown in this embodiment can of course be applied to any one of the above-mentioned embodiments.

This invention is not limited to the above-mentioned embodiments but can be applied in various modifications without departing from the object and scope of the invention.

For example, the above-mentioned embodiment referred to the case where the information extraction system is the frame synchronization system, but this information extraction system may be an address designating system or control signal response system, depending upon a transmission signal form. The address designating system is so designed that each of receiving apparatuses detects the address code included in each transmission signal to extract the information signal necessary to each receiving apparatus. The control signal response system is so designed that each of receiving apparatuses is responsive to the control signal transmitted through an information signal channel to receive the information signal necessary to said each receiving apparatus.

Further, the above-mentioned embodiments referred to the case where the receiving condition of the receiving apparatus is classified in accordance with the extent to which the synchronization is achieved. But the receiving condition of the receiving apparatus can be classified also in accordance with other references such as a receiving field, noise level, or the number of code detection errors, into three types of receiving conditions — a "good" receiving condition, a "bad" receiving condition wherein reception is fully impossible, and an "intermediate" receiving condition, i.e., a pull-in operation waiting condition provided between said "good" and "bad" receiving conditions, whereby these types of receiving conditions are applied to the receiving apparatus.

Further, the clock synchronization system used in this invention can be replaced by other systems such as a synchronization system using a pull-in oscillator or high Q resonator.

Further, the object circuit for undergoing the power saving operation is not limited to the radio receiver 41 but may be, for example, the signal processor 43. The point is that the circuits of the apparatus having no effect upon the switch 51 — controlling function have only to be made inoperative during a period in which they are kept unnecessary. In this case, if a timing device for the power saving operation is provided separately from the synchronization circuits for achieving the synchronization necessary to the signal processing operation, it will be possible to make these synchronization circuits inoperative during a period in which they are kept unnecessary.

Further, in the above-mentioned embodiments, description was made on the premise that the receiving signal was a time-divisional multiple digital signal. But this invention can be applied also to the case where the receiving signal is a time-divisional multiple analog signal.

Further, in the above-mentioned embodiments, description was made by taking, as an example, the portable receiving apparatus using batteries such as the "portable radio calling receiver". But this invention can be applied to any type of receiving apparatus capable of time-division multiplex communication, irrespective of whether it is of the wire or the wireless.

Further, the receiving condition of the receiving apparatus can be classified into the "good", "intermediate" and "bad" conditions also in accordance with the receiving signal-to-noise signal ratio.

Further, the receiving condition of the receiving apparatus can be classified into the "good", "intermediate" and "bad" conditions also in accordance with the number of detection errors of bits constituting each of the clock signals included in the time-divisional multiple signal of the receiving signal.

What we claim is:

1. A time-division multiplex communication receiving apparatus for identifying the subscriber's individual code among a plurality of subscriber's individual codes which are arranged sequentially in time series fashion in a time-division multiplex signal from a key station, said apparatus comprising a receiving section for receiving a time-divisional multiplex signal having clock signal components and frame signal components; a signal processing means for extracting, in synchronization with the clock signal components of said multiplex signal, the subscriber's individual code from a predetermined time zone of said multiplex signal; a first synchronization means to be synchronized with the clock signal components of said multiplex signal; a second synchronization means to be synchronized with the frame signal components of said multiplex signal; a classifying means for classifying the receiving condition of said receiving section in accordance with the combination of the synchronization states of said first and second synchronization means; a control pulse generating means which connected to said processing means for generating, when driven by an output signal from said first and second synchronization means, a control pulse which designates a predetermined period corresponding to the output signals of said synchronization means; and a switching means for controlling, in response to an output signal from said classifying means, a power supply to said receiving section during the period designated by the control signal.

2. A time-division multiplex communication receiving apparatus according to claim 1, wherein said first synchronization means comprises a high speed clock signal generating source for generating a high speed clock pulse having a frequency $2^n$ times as high as the frequency $f$ of said clock signal contained in said input time-divisional multiple signal, a frequency divider for dividing said high speed clock pulse, a waveform shaping circuit for changing the waveform of the output signal from said receiving section to a rectangular one thereby to correct the distortions of the same, and a differential circuit for detecting a point of time at which the level of said clock signal is reversed, and is put into synchronization-established state when an output of said differential circuit is made to match in phase with a high speed clock signal obtained by said frequency divider.

3. A time-division multiplex communication receiving apparatus according to claim 1, wherein said first synchronization means is constituted by a clock synchronization circuit to be synchronized with the clock signal components of said multiplex signal and said second synchronization means is constituted by a frame synchronization circuit to be synchronized with the frame signal components of said multiplex signal, whereby a "good" receiving condition is defined as condition in which both the clock and frame synchronization circuits are kept in synchronization-established state, a "bad" receiving condition as condition in which both the clock and frame synchronization circuits are kept in synchronization-unestablished state, and an "intermediate" receiving condition as condition in which the clock synchronization circuit is kept in synchronization-established state while the frame synchronization circuit is kept in synchronization-unestablished state; and the power supply to said receiving section is cut off for the predetermined period designated by said control pulse when the receiving condition is "good" or "bad".

4. A time-division multiplex communication receiving apparatus according to claim 3, wherein said "intermediate" receiving condition is further classified into "first intermediate" and "second intermediate" receiving conditions; and said "first intermediate" receiving condition is defined as a frame synchronization-missed condition obtained through a transition from a condition in which both clock and frame synchronization circuits are kept in a synchronization-established condition and said "second intermediate" receiving condition is defined as a clock synchronization-regained condition obtained through a transition from a condition in which said both clock and frame synchronization circuits are kept in a synchronization-unestablished condition, whereby even in the case where said receiving condition of said receiving apparatus is said "first intermediate" receiving condition, power supply at least to said receiving section is interrupted during said predetermined time zone.

5. A time-division multiplex communication receiving apparatus according to claim 4, wherein said frame synchronization circuit further comprises a synchronization error detecting circuit, including an up-down counter whereby the frame synchronization is regarded as being established at the time when, in case said clock synchronization circuit is kept in said synchronization-established condition, the number of detection errors in said detecting circuit amount to a specific value.

6. A time-division multiplex communication receiving apparatus according to claim 1, wherein said first synchronization means comprises a memory for storing a identification frame pattern signal specific to a subframe containing the subscriber's individual code; a shift register for storing sequentially the frame signal components contained in said multiplex signal; a comparator for comparing an output of said memory and an output of said shift register; a flip-flop circuit to be set by a coincidence output of said comparator and reset by a non-coincidence output thereof, thereby to detect the coincidence between the outputs of said memory and shift register; a signal generator for generating in response to a set output of said flip-flop circuit a frame synchronization signal which represents the position of said subframe in said multiplex signal; and a logic circuit constituted by a first AND circuit for receiving a set output of said flip-flop and an output of said signal generator, a second AND circuit for receiving a reset output of said flip-flop and an input clock signal, and an OR circuit for receiving the outputs of said first and second AND circuits, thereby producing a timing signal in response to which said comparator operates.

7. A time-division multiplex communication receiving apparatus according to claim 1, wherein said control pulse generating means comprises a counter which is reset upon counting a predetermined number of output clock pulse signals from said first synchronization means, and a flip-flop circuit to be alternately set and reset by the outputs of said counter so as to produce control pulses which designate a predetermined time zone, said counter being reset upon counting the clock pulses generated during the period of time corresponding to said predetermined time zone.

8. A time-division multiplex communication receiving apparatus acccording to claim 1, wherein said signal processing means comprises a memory for storing the subscriber's individual code; a shift register for successively storing the individual codes of all the subscribers, one at a time; a comparator for comparing the output of said memory and that of said shift register, thereby to produce a coincidence output signal if the outputs of said memory and shift register are found to coincide; an AND circuit for receiving an output of said comparator and said control pulse from said control pulse generating means; and means to be operated by an output of said AND circuit so as to show that the subscriber is being called.

9. A time-division multiplex communication receiving apparatus for identifying the subscriber's individual code among a plurality of subscriber's individual codes which are arranged sequentially in time series fashion in a time-divisional multiplex signal having clock signal components and frame signal components from a key station, said apparatus comprising a receiving section for receiving a time-divisional multiplex signal; a signal processing means for extracting, in synchronization with the clock signal components of said multiplex signal, the subscriber's individual code from a predetermined time zone of said multiplex signal; a first synchronization means to be synchronized with the clock signal components of said multiplex signal; a second synchronization means to be synchronized with the frame signal components of said multiplex signal; a classifying means for classifying the receiving condition of said receiving section in accordance with the combination of the synchronization states of said first and second synchronization means; a control pulse generating means for generating, when driven by output signals from said first and second synchronization means, a control pulse having a pulse width which corresponds to said predetermined time zone; a designating means for generating, upon receipt of the outputs of said control pulse generating means and said first and second synchronization means, a switch control signal which designates a period of time corresponding to said time zone; a power source for supplying power to said receiving section and each of said means; and a switching means for controlling, in response to an output of said classifying means, the power supply to said receiving means from said power source only during the period of time designated by the switch control signal, the operation of said switching means being classified according to the output of said classifying means and the switch control signal into "mode 1" defined as condition in which said switching means is always kept "on", "mode 2" defined as condition in which said switching means is kept "on" only during the period corresponding to the subframe which contains the subscriber's individual code, and "mode 3" defined as condition in which said switching means is kept "on" during a period which is as long as said period but earlier than said period and which overlaps said period, whereby the power is supplied from said power source to said receiving section while said switching means is kept closed in either mode.

10. A time-division multiplex communication receiving apparatus according to claim 9, wherein said control pulse generating means comprises a combined unit of a first counter and a first flip-flop, for detecting points of time at which said period corresponding to said "mode2" rises and falls, and another combined unit of a second counter and a second flip-flop, for detecting points of time at which said period corresponding to said "mode 3" rises and falls.

11. A time-division multiplex communication receiving apparatus according to claim 9, wherein a new "mode 2'" having the same time series as that of said "mode 2" is provided to permit said "mode 2'" to correspond to a condition in which both first and second synchronization means are kept in a synchronization-unestablished condition, so that where the clock synchronization is missed under said "mode 2", said "mode 2" is changed-over to said "mode 2'"; where the clock synchronization is regained by using said "mode 2'", said "mode 2'" is changed-over to said "mode 3"; and where the clock synchronization is missed under said "mode 1", said "mode 1" is changed-over to said "mode 2'" thereby to control the power supply to said receiving section even if said "mode 1" is changed over to "mode 2'".

12. A time-division multiplex communication receiving apparatus according to claim 9, wherein said designating means comprises a first AND circuit for receiving an output of said second synchronization means and a first output of said control pulse generating means, which corresponds to "mode 2"; a second AND circuit for receiving an output of said second synchronization means and a second output of said control pulse generating means, which corresponds to "mode 3"; and an OR circuit for receiving the outputs of said first and second AND circuits.

13. A time-division multiplex communication receiving apparatus according to claim 9, wherein said designating means comprises a flip-flop to be set when said first and second synchronizing means are kept in synchronization-established state and synchronization-unestablished state, respectively, and to be reset when said first synchronization means is kept in synchronization-unestablished state or said second synchronization means is kept in synchronization-established state; a first AND circuit for receiving a reset output of said flip-flop and an output of said control pulse generating means, which corresponds to "mode 2"; a second AND circuit for receiving a set output of said flip-flop and an output of said control pulse generating means, which corresponds to "mode 3"; an OR circuit for obtaining a logical sum of the outputs of said first and second AND circuits.

14. A time-division multiplex communication receiving apparatus according to claim 9, further comprising a second control pulse generating means for generating a control pulse which designates the period of time corresponding to the frame which contains the sub-frame containing the subscriber's individual code, every time said frame appears cyclically in said multiplex signal together with the other frames, whereby the power supply to said receiving section is cut off except for said period designated by the control-pulse even if said first and second synchronization means are kept in synchronization-established state and synchronization-unestablished state, respectively.

15. A time-division multiplex communication receiving apparatus according to claim 14, wherein said second control pulse generating means comprises a first counter for making a counting-down operation for each frame cycle, a second counter reset by an output from said first counter to count an input signal supplied to said second counter, and a flip-flop operating upon receipt of an output from said second counter.

* * * * *